May 3, 1960
P. ONORI
2,935,013
SHISH KEBAB SKEWER
Filed Nov. 3, 1958
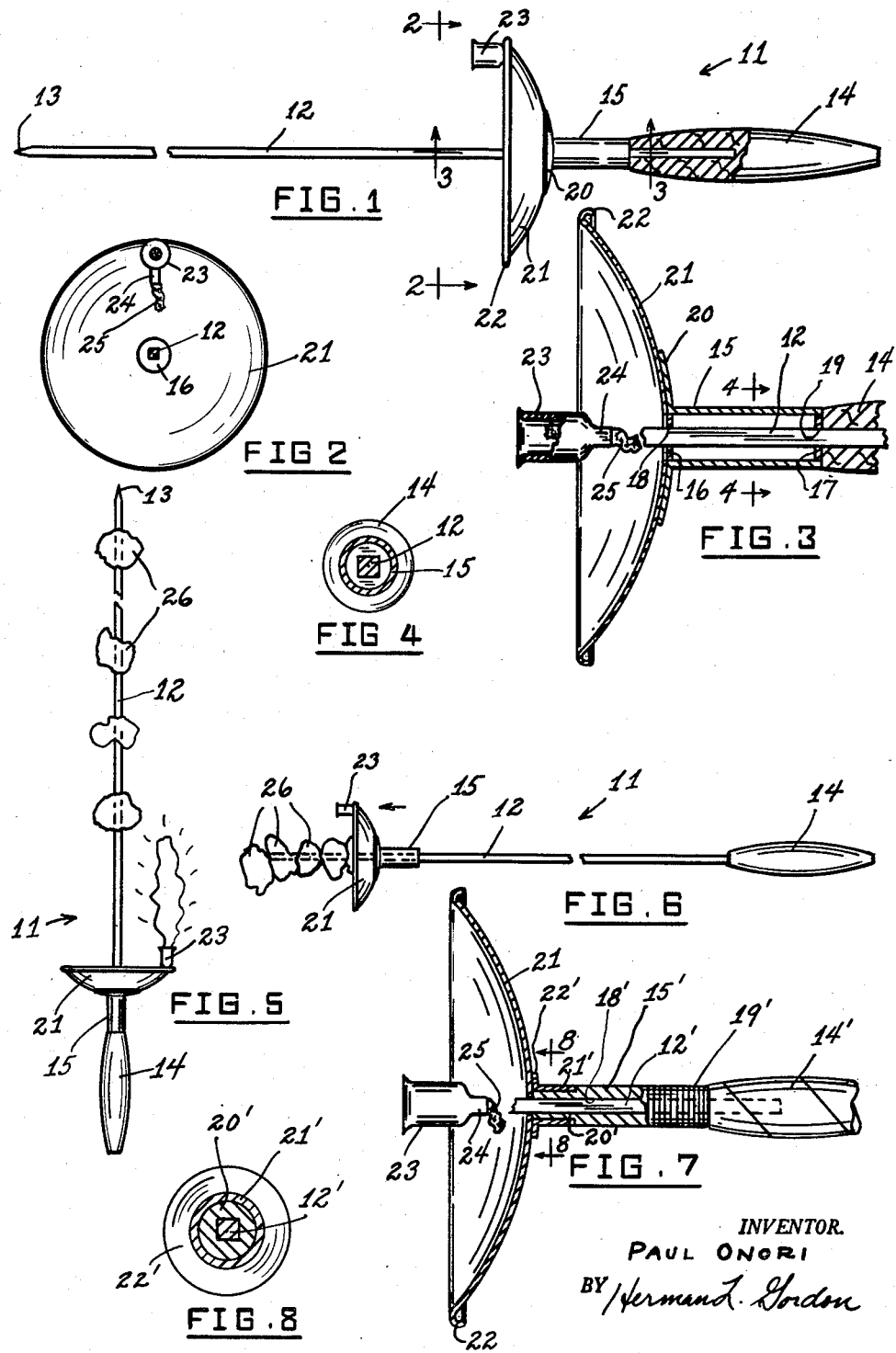
INVENTOR.
PAUL ONORI
BY Herman L. Gordon
ATTORNEY

United States Patent Office 2,935,013
Patented May 3, 1960

2,935,013
SHISH KEBAB SKEWER

Paul Onori, Jersey City, N.J.

Application November 3, 1958, Serial No. 771,461

5 Claims. (Cl. 99—419)

This invention relates to culinary implements, and more particularly to a skewer for use in cooking and dispensing meats and other foods, such as shish kebab, or the like.

A main object of the invention is to provide a novel and improved shish kebab skewer which is simple in construction, which is easy to clean, and which enables meats and other foods cooked thereon to be dispensed in a safe and sanitary manner.

A further object of the invention is to provide an improved shish kebab skewer which is relatively inexpensive to fabricate, which is attractive in appearance, which is sturdy in construction, and which enhances the appearance of the meats and other foods served therefrom.

A still further object of the invention is to provide an improved shish kebab skewer which enables a waiter or other person to safely carry same in an upright position with cooked foods impaled thereon without risk of being burned by hot grease or other drippings, and which is provided with means for illuminating and dramatizing the hot foods, whereby their appearance is enhanced while they are being served.

Further objects and advantages of the invention will become apparent from the following description and claims, and from the accompanying drawings, wherein:

Figure 1 is a side elevational view, partly in cross-section, of an improved shish kebab skewer constructed in accordance with the present invention.

Figure 2 is a transverse vertical cross-sectional view taken on line 2—2 of Figure 1.

Figure 3 is an enlarged fragmentary vertical cross-sectional view taken on line 3—3 of Figure 1, with a portion of the burner element broken away to show its internal construction.

Figure 4 is a transverse vertical cross-sectional view taken on line 4—4 of Figure 3.

Figure 5 is an elevational view showing the skewer of Figures 1 to 4 in an upright position and illustrating the manner in which it is used in carrying cooked impaled foods.

Figure 6 is an elevational view of the skewer in horizontal position and illustrating how the stripper member thereof is moved outwardly along its shank to remove the cooked impaled food articles from the skewer.

Figure 7 is a fragmentary cross-sectional view, similar to Figure 3, but illustrating a modified form of shish kebab skewer according to the present invention.

Figure 8 is an enlarged transverse cross-sectional view taken on line 8—8 of Figure 7.

Referring to the drawings, and more particularly to Figures 1 to 6, 11 generally designates one form of shish kebab skewer according to this invention. The skewer 11 comprises an elongated shank member 12 of stainless steel, or other non-corrosive metal, of non-circular cross-section, for example, of square cross-section, having a sharpened tip 13. The rear end of shank member 12 is rigidly secured in any suitable manner axially in a handle member 14, which may be made of hard wood, or any other suitable heat-insulating or substantially refractory material.

Designated at 15 is a hollow metal sleeve member of substantial length having metal disc members 16 and 17 rigidly secured in its opposite end portions, said disc members being formed with axially aligned square apertures 18 and 19 slidably receiving the shank member 12, as shown in Figure 3.

Sleeve member 15 is formed at its forward end with an annular, arcuately curved flange 20 which is rigidly secured to a centrally apertured, circular, metal guard member 21, which is forwardly concave, as shown in Figure 3, and which may be generally spherical in contour. Guard member 21 is formed at its rim with a rolled stiffening bead or flange 22.

The guard member 21 may be provided with a metal burner cup 23 mounted in its peripheral portion and extending forwardly, namely, parallel to sleeve member 15, as shown. The burner cup is formed with a flat conduit element 24 which is welded, or otherwise rigidly secured, to the inside surface of the guard member and which contains a wick 25 extending into the guard member, so that when the skewer is carried in an upright position with cooked meats or other food articles impaled thereon, as shown in Figure 5, the wick 25, previously soaked with rum or brandy, may be ignited, providing a dramatic torch-like effect as the skewer is carried from the kitchen to the table at which the food is to be served.

Obviously, the burner 23 may be omitted from the guard member 21 within the spirit of the present invention.

The food articles, shown at 26, are impaled on the spit or shank member 12 and are cooked thereon. When the cooked foods are to be dispensed, the stripper member, comprising the sleeve 15 and the guard 21, are pushed forwardly on the shank 12 while holding the handle 14, as shown in Figure 6, causing the food articles to be disengaged from the shank member 12.

In the embodiment illustrated in Figures 7 and 8, the rear end portion of the shank member 12' is rigidly secured axially in a handle member 14'. A solid sleeve member 15' is slidably engaged on the shank member, said sleeve member 15' being formed with a square axial bore 18' slidably and non-rotatably receiving the shank member 12'. Sleeve member 15' is formed with annular corrugations 19' on its outer surface to facilitate grasping same. At its forward end the sleeve member is reduced in diameter, as shown at 20', and an annular ferrule member 21' is secured on the reduced portion 20'. Ferrule member 21' is formed at its forward end with a flange 22' which is rigidly secured to the rear surface of a forwardly concave circular guard member 21, which may be of generally spherical contour, and which is formed with a central aperture aligned with bore 18' for the shank member 12'. The guard member 21 is formed at its periphery with the annular rolled flange 22, and said guard member 21 serves as a protective trap to catch the hot grease or other hot drippings from the impaled food articles when the skewer is carried in an upright position.

A burner cup 23 may be mounted in the peripheral portion of the guard member 21.

As in the previously described form of the invention, the impaled food articles are removed from the spit or shank member 12' by pushing the stripper assembly, comprising sleeve member 15' and guard member 21, forwardly on the shank member while holding the handle 14', whereby the food articles are pushed off the shank member.

It will be understood that before the food articles are impaled on the shank member prior to cooking, the stripper assembly will be disposed on the shank member adjacent the handle, for example, will be in the position shown in Figure 1 or in Figure 7.

While certain specific embodiments of an improved shish kebab skewer have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A skewer device comprising an elongated shank member, a handle secured to one end of said shank member, a hollow sleeve member having disc members rigidly secured in its opposite end portions, said disc members being formed with axially aligned apertures slidably receiving said shank member, the disc member at one end of said sleeve member being engageable with said handle, and a guard member rigidly secured to the opposite end of said sleeve member, said guard member surrounding said shank member and having a concave portion facing the end of said shank member opposite said handle.

2. A skewer device comprising an elongated shank member having a non-circular cross-section, a handle secured to one end of said shank member, a hollow sleeve member, a pair of disc members rigidly secured in the opposite end portions of said sleeve member, said disc members having axially aligned apertures substantially the same in shape as and slidably and non-rotatably receiving said shank member, the disc member at one end of said sleeve member being engageable with said handle, and a guard member rigidly secured to the opposite end of said sleeve member, said guard member surrounding said shank member and having a concave portion facing the end of said shank member opposite said handle.

3. A skewer device comprising an elongated shank member having a non-circular cross-section, a handle secured to one end of said shank member, a hollow sleeve member, a pair of disc members rigidly secured in the opposite end portions of said sleeve member, said disc members having axially aligned apertures substantially the same in shape as and slidably and non-rotatably receiving said shank member, the disc member at one end of said sleeve member being engageable with said handle, and a substantially circular guard member rigidly secured to the opposite end of said sleeve member, said guard member surrounding said shank member and having a generally spherical contour and being concave in a direction facing the end of said shank member opposite said handle.

4. A skewer device comprising an elongated shank member, a handle secured to one end of said shank member, a sleeve member slidably mounted on said shank member and being engageable with said handle at one end of said sleeve member so as to be supported by said handle when the device is carried in an upright position, a guard member rigidly secured to said sleeve member and extending around said shank member, said guard member having a portion thereof which is concave in a direction opposite said handle, a burner cup mounted on said guard member adjacent the concave portion thereof, and a wick in said burner cup and extending into the concave portion of the guard member, whereby combustible drippings from food articles carried on said shank member may be collected in said guard member and may be ignited at said burner cup.

5. A skewer device comprising an elongated shank member of non-circular cross-section, a handle secured to one end of said shank member, a sleeve member slidably and non-rotatably fitting on said shank member and being engageable with said handle at one end of said sleeve member so as to be supported by said handle when the device is carried in an upright position, a generally circular guard member rigidly secured to said sleeve member and extending concentrically around said shank member, said guard member having a portion thereof which is concave in a direction opposite said handle, a burner cup mounted on the periphery of said guard member adjacent the concave portion thereof, a conduit on the lower end portion of said burner cup extending into the concave portion of said guard member, and a wick in said burner cup and extending through said conduit into the concave portion of the guard member, whereby combustible drippings from food articles impaled on said shank member may be collected in said guard member and may be ignited at said burner cup.

References Cited in the file of this patent

FOREIGN PATENTS 23,254     Great Britain _____ Nov. 30, 1894